Oct. 13, 1931.  E. STUDER  1,827,548
AEROPLANE
Filed April 24, 1930  3 Sheets-Sheet 1
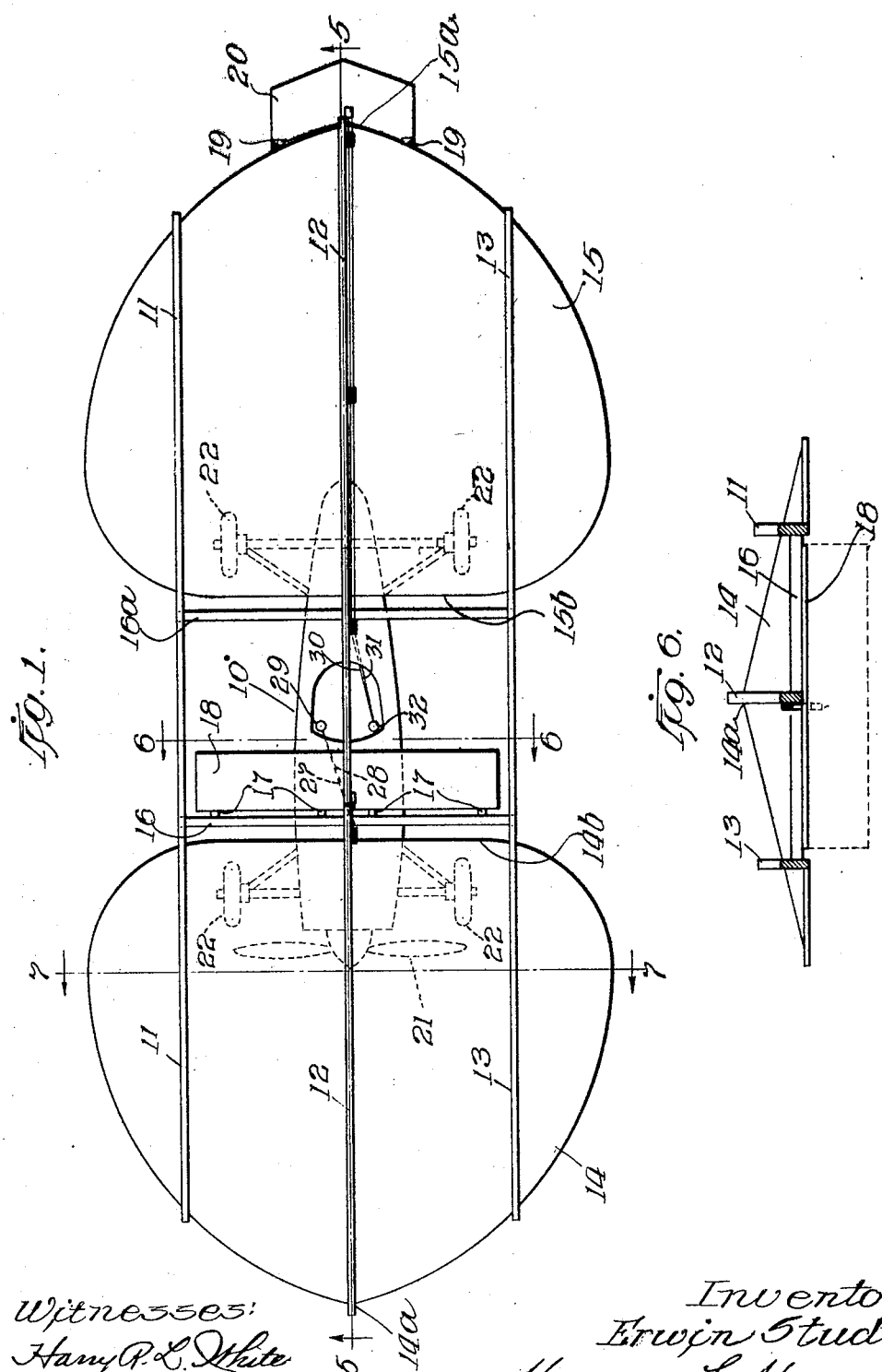

Oct. 13, 1931.  E. STUDER  1,827,548
AEROPLANE
Filed April 24, 1930  3 Sheets-Sheet 2
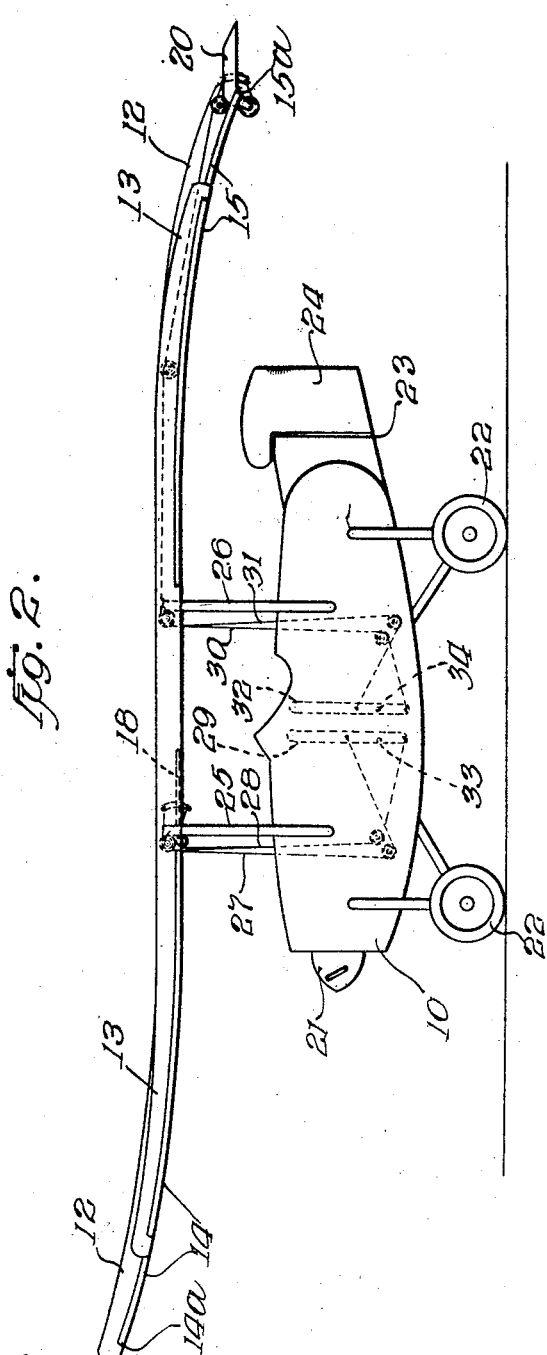
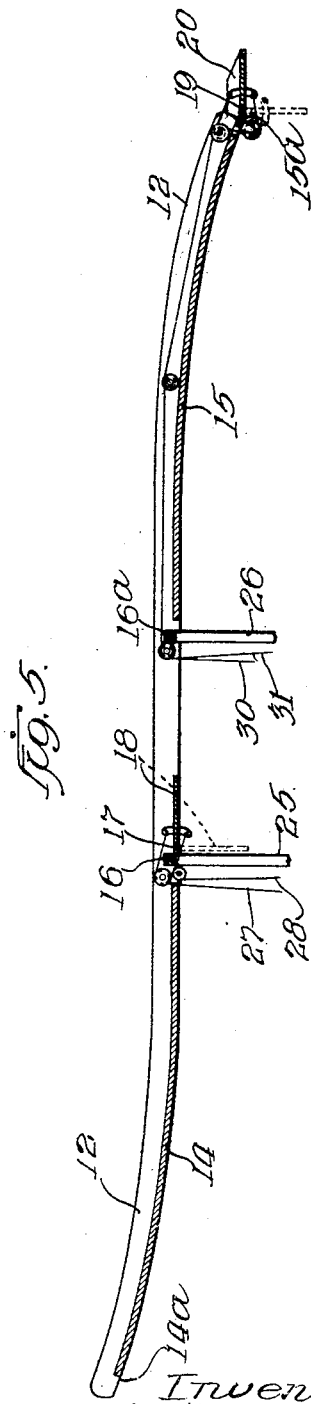
Witnesses:
Harry B. L. White
Robert Cremer
Inventor:
Erwin Studer
By Harvey L. Hanson
Attorney.

Oct. 13, 1931. E. STUDER 1,827,548
AEROPLANE
Filed April 24, 1930 3 Sheets-Sheet 3

Patented Oct. 13, 1931

1,827,548

UNITED STATES PATENT OFFICE

ERWIN STUDER, OF CHICAGO, ILLINOIS

AEROPLANE

Application filed April 24, 1930. Serial No. 446,811.

My invention relates to aeroplanes and particularly to an improved aeroplane construction by which I provide two supporting wings in tandem arrangement, the front one extending beyond the front of the fuselage, and the rear one extending beyond the rear end thereof, the forward portion of the front wing being curved upwardly and the rear portion of the rear wing being curved downwardly, and the rear portion of the front wing and the front portion of the rear wing being in substantially the same horizontal plane.

Furthermore, the wings referred to are preferably heart-shaped and arranged so that the apex of the front wing is in its front edge, the apex of the rear wing is in its rear edge, and the bases of the heart-shaped wings are separated to leave a substantial space between them. The upwardly curved front portion of the front wing and the downwardly curved portion of the rear wing are thus at the apex portions of the wings and at the mid portions laterally of the wings.

By this arrangement, the lifting tendency of the forward portion of the front wing is exerted over an area restricted to the mid portion of the wing, the outer edge portions of the wing laterally, serving to establish a stabilized condition of operation at all times and to a greater degree than if the lifting surface were distributed over the entire lateral extent and over the entire surface of the wing.

A similar effect is produced and for the same reasons in connection with the rear wing, due to the mid portion of its rear surface being curved downwardly. Furthermore, the curved edge conformation of the wings, results in reduced air resistance at the edges of the wings, due to stream-line flow of the air around the wing edges, eliminating eddying currents around the edges, which are produced with wings of rectangular form. This applies to the action of the front wing in entering the air, and it also applies to the action of the rear wing as it passes through the air and permits the edge air currents to close behind it.

In addition to the above, I provide a construction of controlling mechanism consisting of a wing flap hinged at its forward edge adjacent the rear or base edge of the front wing, an elevator horizontally hinged adjacent the rear edge of the rear wing, and a rudder vertically hinged adjacent the rear end of the fuselage, together with operating mechanism consisting of cables, connecting devices and levers, which operating mechanisms are preferably independent of each other.

The wing flap is preferably of a length extending across the greater part of the base or rear edge of the front wing, and of a width leaving a substantial amount of space between the rear edge of the wing flap and the front edge of the rear wing, as a result of which air currents set up by the wing flap, are afforded ample space in which to produce desired results.

While the wing flap may be used in conjunction with the elevator if desired, it is also of use independently of the elevator, for imparting different amounts of desired lifting force to the fuselage depending upon different loads to be carried, whereas the elevator may be employed to change the direction of the aeroplane vertically as desired, for any particular adjustment of the wing flap.

An important advantage of my construction is that the spars employed to support the wings, extending as they do from front to rear of the fuselage, may receive their support from the end portions of the fuselage and thus be separated from front to rear of the aeroplane, a much greater distance than if said spars extended transversely of the aeroplane as is usually the case. In this way a strong and rigid supporting structure is readily produced, imparting a corresponding support to the wings, even though the spars extend beyond the front and rear ends of the fuselage, which they do in my preferred construction.

Any desired type of propelling mechanism may be employed in connection with my construction, which propelling mechanism may conveniently be mounted upon the front end of the fuselage. I do not however, limit myself to the use of any particular type of propelling mechanism, in view of my construction described below, being applicable to aeroplanes generally, regardless of their type or the purpose for which they may be used.

My invention will best be understood by reference to the accompanying drawings which are illustrative of a preferred embodiment thereof, as follows:

Figure 1 shows my aeroplane construction in plan view,

Figure 2 shows in side elevation the construction illustrated in Figure 1,

Figure 3:
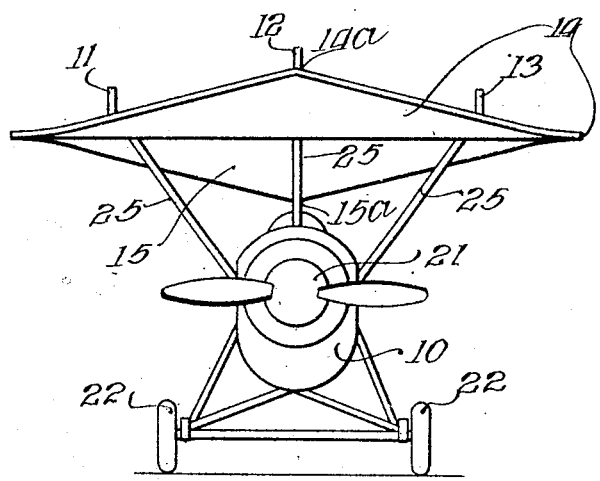
Figure 3 is a front end elevation of the construction shown in Figure 1.
Figure 4:
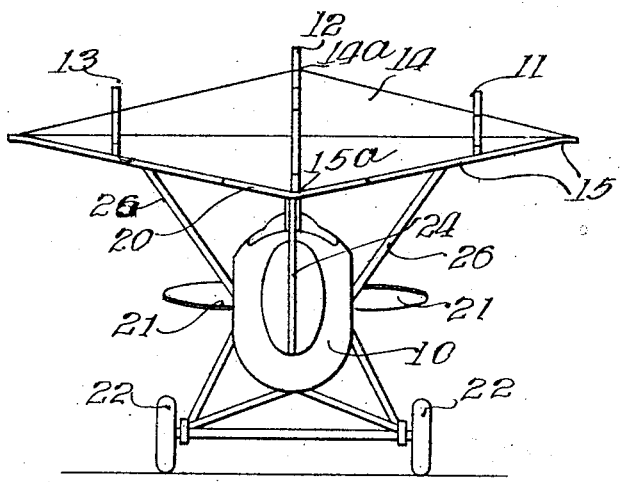
Figure 4 is a rear end elevation of the construction shown in Figure 1.
Figure 7:
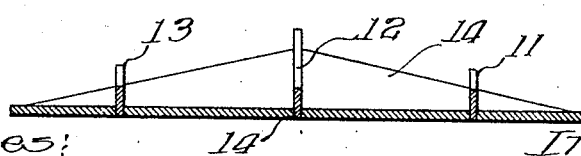

Figure 5 is a vertical, longitudinal sectional view through the wing construction, the wing flap and the elevator, taken along the line 5—5 in Figure 1, Figure 6 is a vertical, transverse sectional view through the spars illustrated in Figure 1 and taken along the line 6—6 in that figure, and Figure 7 is a transverse sectional view of the front wing of the aeroplane taken along the line 7—7 in Figure 1.

Similar numerals refer to similar parts throughout the several views.

As shown in the drawings, my improved construction consists of a fuselage 10 above which spars 11, 12 and 13 are supported in substantially parallel relation extending longitudinally of the aeroplane, these spars in turn supporting a front wing 14 and a rear wing 15, extending respectively in front of and behind the fuselage. Each of the wings 14 and 15 preferably is of heart-shaped conformation, the apex 14a of the wing 14 being at the front end of the aeroplane, and the base 14b constituting the rear edge of said wing.

The wing 15 is preferably of the same shape laterally, as the wing 14, the only difference being that its apex 15a is at the rear end of the aeroplane, and its base 15b constitutes its front edge, the bases 14b and 15b being in substantially parallel relation and separated a substantial distance from each other.

The spars 11, 12 and 13 support a transverse bar 16 adjacent the rear edge of the wing 14, which bar in turn has hinged to it as shown at 17, the front edge of a wing flap 18 having a length substantially equal to the distance between the outermost spars 11 and 13, and a width such that a substantial amount of space is left between the rear edge of the wing flap and the front edge of the wing 15, said space being preferably greater than the width of the wing flap. This provides that air currents set up by the wing flap, may have ample opportunity to flow without hindrance in the manner required to permit the wing flap to accomplish its intended purpose. The spars 11, 12 and 13 also support an additional transverse bar 16a adjacent the front edge of the wing 15.

The rear edge of the rear wing 15, has hinged to it on a horizontal axis as shown at 19, an elevator 20, by which the direction of the aeroplane vertically may be controlled as desired.

The fuselage may be equipped with any type of motive power and the aeroplane may be driven by a propeller 21 of any type desired, the particular type of motive mechanism and propeller being no part of my present invention, since the latter consists of the particular form and relation of the wings, wing flap, elevator and rudder and their support from the fuselage in substantially the manner and for the purposes described, regardless of the means used to drive the aeroplane through the air and regardless of the purpose for which the aeroplane may be employed.

The fuselage 10 may be provided with landing gear 22 of any desired type depending upon the use of the aeroplane, the particular type of landing gear illustrated being that commonly employed for landing on the ground.

As shown in Figure 2, the fuselage 10 has hinged to its rear end on a vertical axis at 23, a rudder 24 by which the direction of the aeroplane may be changed horizontally as desired. In this figure I show struts 25 and 26 which may be employed to support the spars 11, 12 and 13 from the fuselage. In this figure I also show cables 27 and 28 extending from the wing flap 18 to different portions of an operating lever 29 in the fuselage, so that moving the lever 29 in one direction or the other, raises or lowers the wing flap 18 as desired. In this view I also show cables 30 and 31 extending from the elevator 20 to different portions of a second lever 32 in the fuselage, so that movement of the lever 32 in one direction or the other may raise or lower the elevator 20 as desired.

While the levers 29 and 32 may be operated at the same time if desired, the operating mechanism described, permits the wing flap 18 to be operated independently of the elevator 20 when it is desired to have the effect of either of these controlling devices without the effect of the other or when it is desired to have the effect of one of said devices to a different degree relatively to the effect of the other of said devices, from that which would be secured if both of said levers 29 and 32 were operated at the same time and to the same degree. The levers 29 and 32 are shown as pivotally supported in the fuselage at 33 and 34 respectively.

As shown in Figures 2 and 5, the front ends of the spars and the front portion of the wing 14 are curved upwardly, only the spars 12 and 13 being visible in these views, and it being understood that the spar 11 is of the same shape as the spar 13. It will also be observed that the rear ends of the spars and the rear portion of the wing 15 are curved downwardly, and also that the rear portion of the wing 14 and the front portion of the wing 15 are in substantially the same horizontal plane which is also the plane of the wing flap 18 when in its horizontal position.

As a result of this form of the wings 14 and 15, and as a result of the relation of the wing surfaces to each other as described, it will be observed that the front portion of the wing 14 exerts a lifting effect on the aeroplane, that the rear portion of the wing 14 and the front portion of the wing 15, being substantially in the same plane, tend to impart a stabilized direction of movement in that plane to the aeroplane, and that the downwardly curved portion of the wing 15 also exerts a lifting effect on the aeroplane.

On account of the wings being of substantially the same form and size, and each of them being symmetrical about its axis extending longitudinally of the aeroplane, the maximum lifting effect of the wings is in a vertical plane extending longitudinally through the fuselage, the apex portions of the wings being at greater inclination to a horizontal plane than other parts of the wings.

It will also be observed that the tapered apex portion of the wing 14, by its lateral engagement with the air into which it enters, spreads the air laterally with a minimum of resistance and without imparting eddying currents to the air, that would be set-up if the entering edge of the wing extended perpendicularly to the direction of motion of the aeroplane; also that the curved rear edge portions of the wing 14 adjacent its base portion 14b, permit stream-line flow of the air around the edge of the wing, without undesirable eddying currents, which further reduces the resistance to motion of the wing through the air. Similarly, the similarly formed wing 15 enters the air with a minimum of resistance and provides for stream-line flow of the air around its rear edge portions.

From the relation of the parts shown in Figure 5, it will be observed that if the wing flap 18 and the elevator 20 are depressed at the same time, the effect is to impart an increased lifting effect to both ends of the fuselage; that if the wing flap 18 is depressed without depressing the elevator 20, an increased lifting effect is imparted to the front end of the fuselage without material change in the lifting effect of the wing 15; also, that depressing the elevator 20 without depressing the wing flap 18, imparts an increased lifting effect to the wing 15, without materially changing the lifting effect on the front end of the fuselage.

It will be observed however, that the lifting effect of the wing flap 18 is over the mid portion of the fuselage 10, whereas the lifting effect of the elevator 20 is a considerable distance to the rear of the fuselage. As a result, where it is required to lift a relatively heavy load, this may be accomplished by depressing the wing flap 18, leaving the elevator 20 free to guide the aeroplane vertically for any position of said wing flap.

It will be noted, that the rudder 24 is mounted on the rear end of the fuselage 10, and that the fuselage and rudder are located a substantial distance below the supporting wings 14 and 15. As a result, when the rudder 24 is turned to impart a turning movement horizontally to the aeroplane, the centrifugal force of the fuselage will tilt the aeroplane about the longitudinal axis of the supporting wings and automatically bank the aeroplane to avoid side slip that would otherwise occur in making horizontal turns.

While I have shown my invention in the particular embodiment above described, it will be understood that I do not limit myself to this exact construction as I may employ equivalents known to the art at the time of the filing of this application without departing from the scope of the appended claims.

What I claim and desire to secure by Letters Patent is:

1. In an aeroplane, the combination of a fuselage, spars supported in substantially parallel relation above said fuselage and projecting beyond the front and rear ends thereof, the front ends of said spars being curved upwardly and the rear ends thereof being curved downwardly, front and rear heart-shaped wings supported in tandem relation by said spars, the apex of said front wing being at its forward edge and the apex of said rear wing being at its rear edge, a wing flap having a hinged support along its front edge adjacent the rear edge of said front wing and of a length substantially equal to the base of said wing, the bases of said wings being spaced a substantial distance from each other affording a clearance space between the rear edge of said wing flap and the base of said rear wing greater than the width of said wing flap, an elevator hinged on a horizontal axis adjacent the rear edge of the rear wing, a rudder hinged on a vertical axis adjacent the rear end of said fuselage, the front portion of said front wing having substantially the upward curvature of the front ends of said spars and the rear portion of the rear wing having substantially the downward curvature of the rear ends of said spars, the rear portion of the front wing and the front portion of the rear wing being substantially in the same horizontal plane, and mechanism for operating said wing flap, said elevator and said rudder.

2. In an aeroplane, the combination of a fuselage, spars supported in substantially parallel relation above said fuselage and projecting beyond the front and rear ends thereof, the front ends of said spars being curved upwardly and the rear ends thereof being curved downwardly, front and rear heart-shaped wings supported in tandem relation by said spars, the apex of said front wing being at its forward edge and the apex of said rear wing being at its rear edge, a wing flap having a hinged support along its front edge adjacent the rear edge of said front wing and of a length substantially equal to the base of said wing, the bases of said wings being spaced a substantial distance from each other affording a clearance space between the rear edge of said wing flap and the base of said rear wing greater than the width of said wing flap, an elevator hinged on a horizontal axis adjacent the rear edge of the rear wing, a rudder hinged on a vertical axis adjacent the rear end of said fuselage, the front portion of said front wing having substantially the upward curvature of the front ends of said spars and the rear portion of the rear wing having substantially the downward curvature of the rear ends of said spars, the rear portion of the front wing and the front portion of the rear wing being substantially in the same horizontal plane, and mechanism for operating said wing flap, said elevator and said rudder, the operating mechanism of said wing flap comprising a first lever and devices connecting it with said wing flap and the operating mechanism of said elevator comprising a second lever and devices connecting it with said elevator, said levers and connecting devices being independent of each other.

3. In an aeroplane, the combination of a fuselage, spars supported in substantially parallel relation above said fuselage and projecting beyond the front and rear ends thereof, front and rear heart-shaped wings supported in tandem relation by said spars, the apex of said front wing being at its forward edge and the apex of said rear wing being at its rear edge, a wing flap having a hinged support along its front edge adjacent the rear edge of said front wing and of a length substantially equal to the base of said wing, the bases of said wings being spaced a substantial distance from each other affording a clearance space between the rear edge of said wing flap and the base of said rear wing greater than the width of said wing flap, an elevator hinged on a horizontal axis adjacent the rear edge of the rear wing, a rudder hinged on a vertical axis adjacent the rear end of said fuselage, the front portion of said front wing having an upward curvature at its mid portion and the rear portion of the rear wing having a downward curvature at its mid portion, the rear portion of the front wing and the front portion of the rear wing being substantially in the same horizontal plane, and mechanism for operating said wing flap, said elevator and said rudder, 4. In an aeroplane, the combination of a fuselage, spars supported in substantially parallel relation above said fuselage and projecting beyond the front and rear ends thereof, the front ends of said spars being curved upwardly and the rear ends thereof being curved downwardly, front and rear heart-shaped wings supported in tandem relation by said spars, the apex of said front wing being at its forward edge and the apex of said rear wing being at its rear edge, a wing flap having a hinged support along its front edge adjacent the rear edge of said front wing and of a length substantially equal to the base of said wing, the bases of said wings being spaced a substantial distance from each other affording a clearance space between the rear edge of said wing flap and the base of said rear wing greater than the width of said wing flap, the front portion of said front wing having substantially the upward curvature of the front ends of said spars and the rear portion of the rear wing having substantially the downward curvature of the rear ends of said spars, the rear portion of the front wing and the front portion of the rear wing being substantially in the same horizontal plane, and mechanism for operating said wing flap.

5. In an aeroplane, the combination of a fuselage, spars supported in substantially parallel relation above said fuselage and projecting beyond the front and rear ends thereof, front and rear heart-shaped wings supported in tandem relation by said spars, the apex of said front wing being at its forward edge and the apex of said rear wing being at its rear edge, a wing flap having a hinged support along its front edge adjacent the rear edge of said front wing and of a length substantially equal to the base of said wing, the bases of said wings being spaced a substantial distance from each other affording a clearance space between the rear edge of said wing flap and the base of said rear wing greater than the width of said wing flap, the front portion of said front wing having an upward curvature at its mid portion and the rear portion of the rear wing having a downward curvature at its mid portion, the rear portion of the front wing and the front portion of the rear wing being substantially in the same horizontal plane, and mechanism for operating said wing flap.

6. In an aeroplane, the combination of supporting members, and front and rear heart-shaped wings in tandem relation, the apex of said front wing being at its forward edge and the apex of said rear wing being at its rear edge, the base portions of said wings being spaced from each other and substantially in the same plane.

7. In an aeroplane, the combination of supporting members, front and rear heart-shaped wings in tandem relation, the apex of said front wing being at its forward edge and the apex of said rear wing being at its rear edge, the base portions of said wings being spaced from each other and substantially in the same plane, and a wing flap hinged at its forward edge adjacent the rear edge of said front wing and disposed symmetrically about the longitudinal axes of said front wing.

8. In an aeroplane, the combination of supporting members, front and rear heart-shaped wings in tandem relation, the apex of said front wing being at its forward edge and the apex of said rear wing being at its rear edge, the base portions of said wings being spaced from each other and substantially in the same plane, a wing flap hinged at its forward edge adjacent the rear edge of said front wing and disposed symmetrically about the longitudinal axis of said front wing, and operating mechanism for raising and lowering said wing flap.

9. In an aeroplane, the combination of supporting members, front and rear heart-shaped wings in tandem relation, the apex of said front wing being at its forward edge and the apex of said rear wing being at its rear edge, the base portions of said wings being spaced from each other and substantially in the same plane, and a wing flap hinged at its forward edge adjacent the rear edge of said front wing and disposed symmetrically about the longitudinal axis of said front wing, the space from front to rear between said wing flap and said rear wing being greater than the width of said wing flap.

10. In an aeroplane, the combination of supporting members, front and rear wings in tandem relation and spaced a substantial distance from each other, said front wing having a laterally tapered front portion narrowest in the front edge of the wing and said rear wing having a laterally tapered rear portion narrowest in the rear edge of said wing, and a wing flap hinged at its forward edge adjacent the rear edge of said front wing and disposed symmetrically about the longitudinal axis of said front wing.

11. In an aeroplane, the combination of supporting members, front and rear wings in tandem relation and spaced a substantial distance from each other, said front wing having a lateral tapered front portion narrowest in the front edge of the wing and said rear wing having a laterally tapered rear portion narrowest in the rear edge of said wing, a wing flap hinged at its forward edge adjacent the rear edge of said front wing and disposed symmetrically about the longitudinal axis of said front wing and operating mechanism for raising and lowering said wing flap.

12. In an aeroplane, the combination of supporting members, front and rear wings in tandem relation and spaced a substantial distance from each other, said front wing having a laterally tapered front portion narrowest in the front edge of the wing and said rear wing having a laterally tapered rear portion narrowest in the rear edge of said wing, a wing flap hinged at its forward edge adjacent the rear edge of said front wing and disposed symmetrically about the longitudinal axis of said front wing, and an elevator hinged on a horizontal axis adjacent the rear edge of said rear wing.

13. In an aeroplane, the combination of supporting members, front and rear wings in tandem relation and spaced a substantial distance from each other, said front wing having a laterally tapered front portion narrowest in the front edge of the wing and said rear wing having a laterally tapered rear portion narrowest in the rear edge of said wing, a wing flap hinged at its forward edge adjacent the rear edge of said front wing and disposed symmetrically about the longitudinal axis of said front wing, an elevator hinged on a horizontal axis adjacent the rear edge of said rear wing, and operating mechanism for raising and lowering said wing flap and said elevator.

14. In an aeroplane, the combination of supporting members, front and rear wings in tandem relation and spaced a substantial distance from each other, said front wing having a laterally tapered front portion narrowest in the front edge of the wing and said rear wing having a laterally tapered rear portion narrowest in the rear edge of said wing, a wing flap hinged at its forward edge adjacent the rear edge of said front wing and disposed symmetrically about the longitudinal axis of said front wing, an elevator hinged on a horizontal axis adjacent the rear edge of said rear wing, and operating mechanism for raising and lowering said wing flap and said elevator, said operating mechanism comprising a first lever and devices connecting it with said wing flap and a sectional lever independent of said first lever and having devices connecting it with said elevator.

In witness whereof, I hereunto subscribe my name this 19th day of April, A. D. 1930.

ERWIN STUDER.